Aug. 28, 1934.    G. H. EMERSON ET AL    1,972,041
FRICTION VEHICLE DRAFT AND BUFFING GEAR
Filed Nov. 23, 1932    5 Sheets-Sheet 1

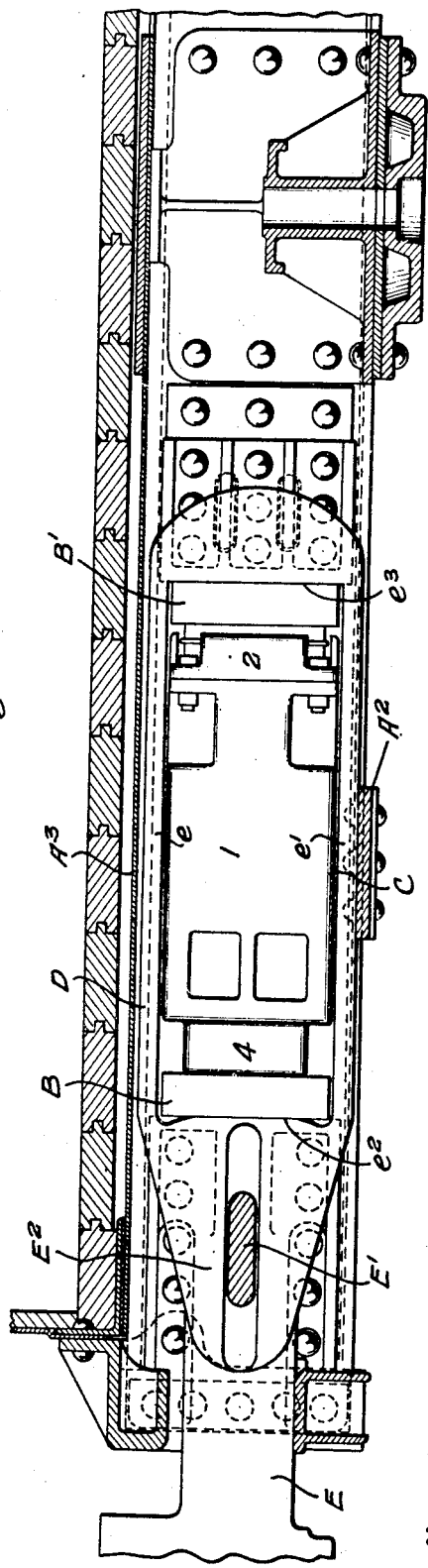
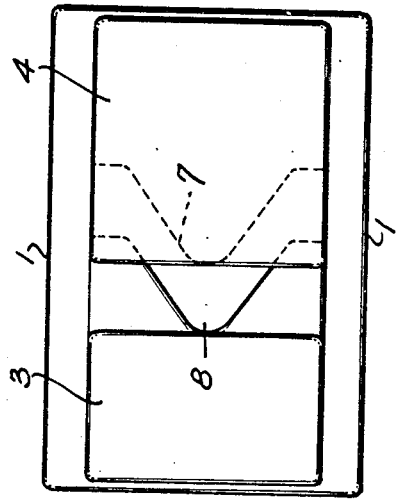
Fig. 2.
Fig. 3.

Aug. 28, 1934.   G. H. EMERSON ET AL   1,972,041
FRICTION VEHICLE DRAFT AND BUFFING GEAR
Filed Nov. 23, 1932   5 Sheets-Sheet 3

Inventors
George H. Emerson
John J. Tatum
By [signature]
Attorney

Aug. 28, 1934.   G. H. EMERSON ET AL   1,972,041
FRICTION VEHICLE DRAFT AND BUFFING GEAR
Filed Nov. 23, 1932    5 Sheets-Sheet 5

George H Emerson
John J Tatum   Inventors
By
Edwin S Clarkson
Attorney

Patented Aug. 28, 1934

1,972,041

UNITED STATES PATENT OFFICE 1,972,041

FRICTION VEHICLE DRAFT AND BUFFING GEAR

George H. Emerson and John J. Tatum, Baltimore, Md.

Application November 23, 1932, Serial No. 644,104

3 Claims. (Cl. 213—30)

This invention relates to draft and buffing gear of that type employing both spring action and friction in the buffing and pulling operations.

The primary object of the invention is to provide a draft and buffing gear that will cushion on a cushion, embodying a high capacity cushion means composed of spring and friction resistance elements, effective to the degree of spring resistance and friction on the least degree of pulling or buffing movement, so as to obtain a more highly efficient and reliable cushioning and shock absorbing action than is possible with draft gears heretofore in use.

A further object of the invention is to provide a draft and buffing gear of the character described embodying semi-elliptic springs whose end bearing surfaces vary as to position according to the compressive force acting thereon, whereby the effective length of each spring is varied, and the distance between its bearing points changed, to make the spring stiffer and increase its resistance, and at the same time increasing the friction between plates, to automatically increase or decrease the friction bearing contact and the friction of the spring leaves and thereby increase or decrease the capacity of the spring.

A still further object of the invention is to provide springs of the character described having friction generating surfaces varying with their capacity, thus increasing the effectiveness of the springs.

A still further object of the invention is to provide tapered friction shoes or members which are movable toward and from each other, or inwardly and outwardly with relation to each other and for wedging engagement with stationary friction surfaces on the gear housing, whereby their frictional resistance to longitudinal movement is increased for a buffing action.

A still further object of the invention is to provide a novel construction of followers and sets of transverse and horizontal elliptical springs of the character described between the followers and friction shoes whereby a draft gear of much greater cushioning and shock absorbing capacity than those heretofore in use is produced.

A still further object of the invention is to provide cushioning elements of high capacity rubber at the rear of the draft gear, which has a greater capacity than the spring and friction elements enclosed in the housing composing the gear, which will increase the cushioning results, resulting in less damaging effect to the gear itself and the car to which it is attached than any other known draft gear.

With these and other objects in view, the invention consists of the features of construction, combination and arrangement of parts, hereinafter fully described and claimed, reference being had to the accompanying drawings, in which:—

Fig. 2 is a side elevation, partly in section, of the same.

Fig. 3 is an end elevation of the gear housing and parts carried thereby.

Fig. 4 is a cross-section on line 4—4 of Fig. 1.

Figure 1:
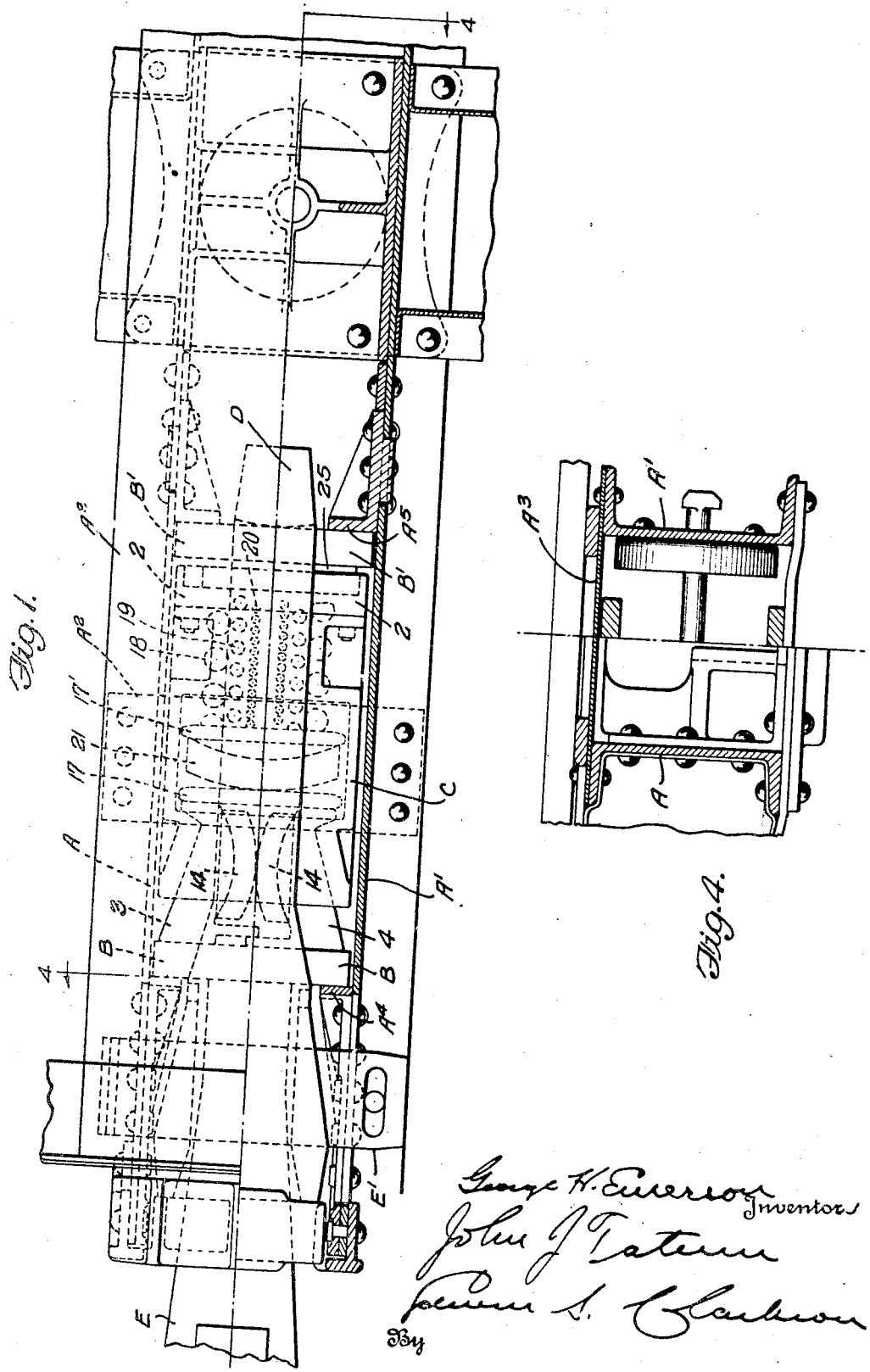
Fig. 1 is a top plan view, partly in section, of a draft gear embodying the invention and a portion of a car on which the draft gear is mounted.

Referring now more particularly to the drawings, A and A' represent longitudinal frame members forming a part of the substructure of a car body, $A^2$ a transverse plate connecting said members at their lower portions, $A^3$ a cover plate above the space between the members, $A^4$ and $A^5$ front and rear stops for the draft gear secured to the members A, A', B and B' front and rear follower plates which respectively engage the front and rear stops $A^4$ and $A^5$, C our novel draft-gear disposed between said follower plates, D a yoke embracing the follower plates and the draft gear, and E a drawbar coupled by a transverse pin or key E' to the yoke by engagement of the ends of the pin in the slotted yoke arms $E^2$, all of which parts may be of the ordinary or any approved construction. The yoke is provided with an upper longitudinal member $e$, a lower longitudinal member $e'$, a front wall or shoulder $e^2$, which engages the front follower, and a rear wall or shoulder $e^3$ which engages the rear follower.

The gear C comprises a gear housing 1 which is open at each end and normally closed at its rear end by a head 2 bolted or otherwise secured thereto. At its forward end the housing slidably receives an expansible and contractible friction wedge composed of a pair of friction shoes 3 and 4 provided upon their outer sides and top with inclined or tapered friction faces 5 to engage correspondingly shaped friction faces 6 on the top and sides of the inner surface of the forward end of the housing. These friction faces taper or converge rearwardly for a progressive increase of friction on such movement of the friction wedge in a buffing action. The wedge shoes are movable laterally toward each other on a rearward movement of the wedge and away from each other on a forward movement of the wedge, whereby lateral contraction and expansion of the wedge is effected, and for the purpose of providing the necessary friction surface between the follower plates and the top edges of the friction shoes, the wedge shoes are provided with inter-engaging guide tongues 7 and recesses or grooves 8. As shown, the outer or forward end of the wedge bears against the follower plate B and at their inner ends the wedge shoes are formed with stop lugs 9 to engage stop shoulders 10 on the casing, whereby the outward or forward movement of the wedge is limited. Preferably the shoes have solid bottom or sole portions 11 forming friction faces to engage friction surfaces 12 at the bottom of the forward end of the housing so that a large amount of friction surface will be presented for shock absorbing operations in pulling and buffing actions. Any or all of the friction surfaces of the shoes may be provided with grooves to receive lubricating inserts 13 of lead or other lubricating metal or material so that ease of motion, with the required degree of friction, may be obtained without undue heating of the friction surfaces.

Figure 8:
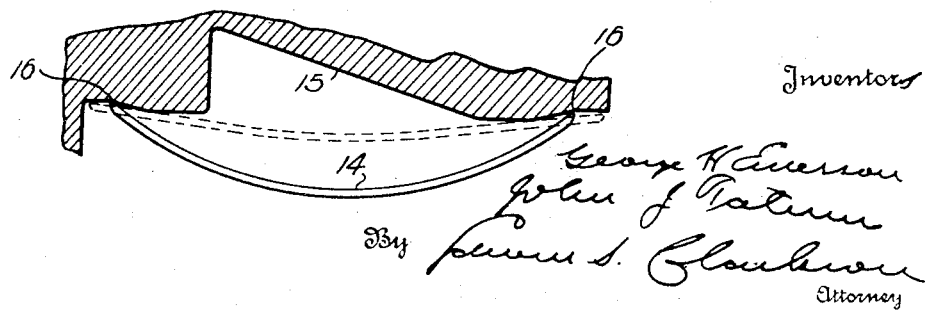
Fig. 8 is a similar view on an enlarged scale showing the spring in normal and fully compressed conditions.
Figure 8A:
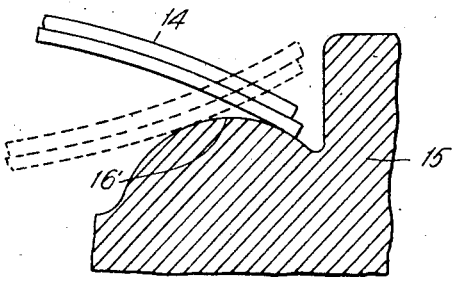
Fig. 8a is a detail view showing a modification in one of the features of construction.

The shoes 3 and 4 are of hollow or chamfered formation, and in each shoe is arranged a longitudinally extending and vertically disposed semi-elliptical spring 14. The springs 14 are arranged back to back, or with their convex surfaces in opposition and their concaved surfaces facing outward laterally toward spring seats 15 provided upon the outer sides of the inner faces of the shoes. Each of these seats 15 is provided with spaced bearing faces as illustrated at 16 in Fig. 8, each of which is formed of two parallel end faces joined by an intermediate inclined face, but which, as shown at 16' in Fig. 8a, may be extended on a curved line corresponding substantially to the line of curvature of the concaved side of the spring, and the ends of the terminal leaf at each side of the spring rest and slide upon the bearing faces 16 as the spring expands and contracts. The function of these springs is to force the shoes apart and into close engagement with the lateral friction faces of the housing while permitting the shoes to yield inwardly on relative back and forward movements between the housing and shoes in pulling and buffing operations, to institute a progressively increasing frictional resistance to shocks and jars and to cooperate with the cushioning springs of the gear to effect a cushioning and shock absorbing action. It will be observed that each spring is free to expand and contract under compression and relief from compression without shackling resistance, and that the spring ends and their bearings are in such bearing contact, as shown particularly in Fig. 8, that the inner or terminal leaf of the spring at its concaved side is slidably movable over the bearing faces within a range providing a multitude of bearing or contact points between the bearing surfaces and the spring ends, whereby the effective length of the spring is shortened under compression of the spring and lengthened under release of the spring from compression. By this means, as the spring is compressed, or the load upon it increases, the effective length of the spring is decreased and its capacity increased, to effectually absorb shocks and jars of increasing intensities, while, as the load decreases or compression diminishes, the effective length of compression decreases and its capacity decreases, so as to give a soft and velvety spring action under light loads and at all times when the spring is under a more or less low degree of compression. A great advantage of this construction, in addition to those stated is that the spring is instantly responsive to the slightest as well as the greatest degree of motion of the shoes of the associated gear parts in pulling and buffing operations so as to effectually oppose and absorb slight shocks and jars as well as to oppose and absorb heavy shocks and jars up to the maximum degree to which the gear is normally subjected. Preferably each spring is of the type shown, that is to say, composed of a bundle of leaves which are loosely mounted or unshackled with relation to each other, and merely kept into proper relative relation by the parts with which it coacts, so that each spring is free to expand and contract to its fullest possible extent and in such manner that under different degrees of compression the resistance of the spring to compression will be increased above normal resistance to bending by the frictional action of the leaves themselves in their sliding engagements with each other. This construction of expanding and contracting wedge, composed of relatively movable friction shoes, in cooperation with springs of the character described, provides for a higher degree of frictional and spring shock absorbing actions than is possible with friction and spring gear elements of a corresponding kind heretofore in use.

Arranged within the housing is a front abutment plate or follower 17 and a rear abutment plate or follower 17', between which latter and the head 2 are disposed a heavy service spring 18 and one or more lighter restoration springs 19 and 20. The outer or front face of the plate 17 is tapered to bear against the inner end of the friction wedge, for the purpose of resisting the movement of the wedges toward each other as the gear is being compressed, and for the purpose of providing high generating friction between plate 17 and bottoms of wedges 3 and 4, while the inner or rear face of the plate 17 is of convex form and faces the correspondingly shaped outer face of the plate 17', and between these plates is placed a vertically disposed transverse semi-elliptical shock absorbing spring 21 of the same type as the spring 14. The terminal leaf of the convex side of this spring 21 seats against the convex rear face of the plate 17 while the terminal leaf at the concaved side of the spring faces the outer side of plate 17' and has its free end portions engaging spaced bearing surfaces 22 on said plate 17', these bearing surfaces 22 being similar to the bearing surfaces 16 previously described and the ends of the spring 21 having the same action thereon as the ends of the spring 14 on said surfaces 16. Thus it will be understood that the spring 21 is adapted to be compressed and expanded under stress in either buffing or pulling actions and to contract when stress is removed therefrom and that such spring will be responsive to all stresses and, by reason of its variable bearing engagement with surfaces 22 and the freedom of motion of its leaves, will have its effective length increased or diminished and its frictional resistance to movement of the gear also increased or diminished, with a corresponding variance in its capacity under light and heavy shocks, so as to insure that the least movement of the gear from released to compressed condition is opposed by both spring and friction resistance, the friction resistance automatically increasing as the degree of compression increases. The springs 14 and 21, therefore, act both as resilient and friction cushioning elements and the spring 21 cooperates with the springs 18, 19 and 20 to increase the elasticity of action as well as the degree of resilient cushioning effect, while the springs 14 and 21 cooperate with each other and the friction shoes and surfaces to increase the frictional shock absorbing action and to provide a gear in which the combined spring and frictional shock absorbing capacity is enormously increased over other draft gears of this type heretofore used or suggested. In laboratory tests under the American Railway Association 9,000 pound drop, this gear develops 26,000,000 foot pounds of work without shearing the rivets in the back draft lugs, while the next best gear found, under the same treatment, developed only 1,200,000 foot pounds of work before the rivets were sheared in the back draft lugs, thus showing the great superiority of this gear over other gears.

The gear housing is preferably provided with an opening 1a in one (or each) of its sides to permit of the ready and convenient introduction and removal of the friction and cushioning elements without the necessity of inserting and removing the same from an end of the housing and disturbing parts of the draft gear. This opening is preferably composed of intersecting longitudinally and transversely extending portions, or is cross-shaped, in order to provide an opening of adequate size and convenient arrangement of portions for the purpose without unduly weakening the housing.

Figure 9:
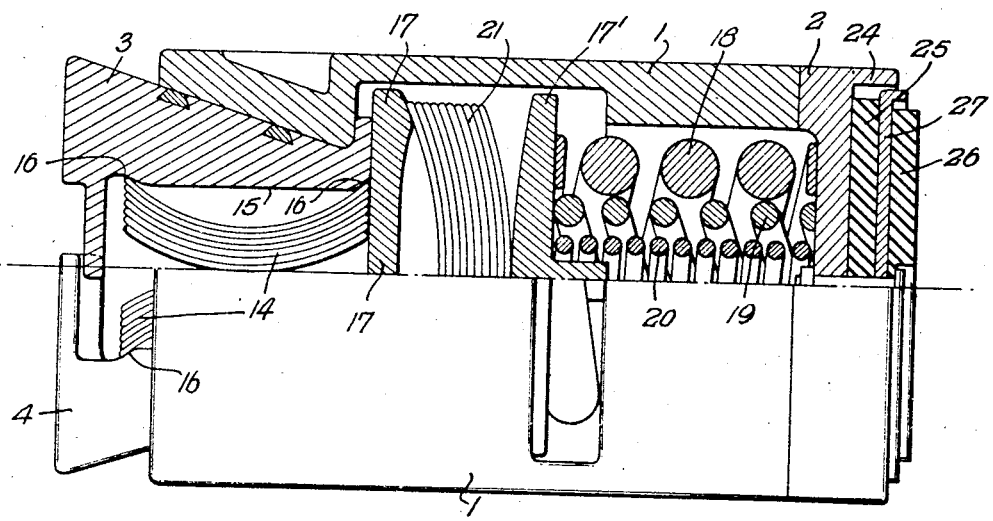
Figs. 9 and 10 are views similar to Fig. 5, showing other modified forms of the invention.
Figure 10:
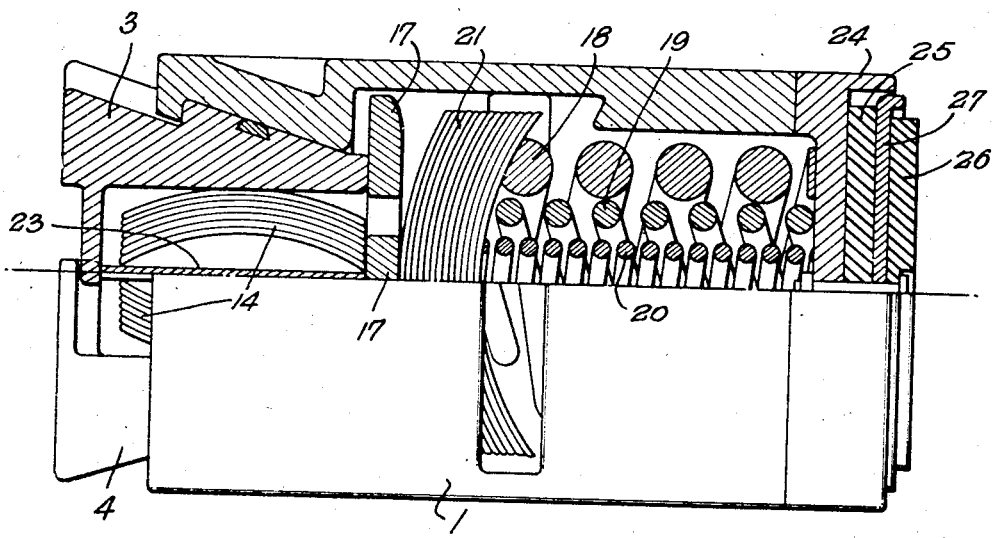

In Fig. 9 we have shown a modification in the gear construction wherein the arrangement of the spring 21 and coacting surfaces of the disks 17 and 17' is reversed from that previously described, the structure being otherwise substantially the same. Also in Fig. 10 another modification is shown in which the springs 14 are reversed in arrangement from that previously described and their free ends arranged to bear against an interposed bearing plate 23, while in this structure the disk 17' is dispensed with and the concaved face of the spring 21 disposed to abut against the forward ends of springs 18, 19 and 20, the adjacent end convolution of spring 18 being formed to provide bearing surfaces for the ends of the spring.

A rubber shock absorbing means is preferably provided between the head 2 and the rear stop plate B'. This rubber shock absorbing means is preferably of compound rubber cushion type, but may consist of one or more thicknesses of rubber. As shown in the present instance, the head 2 is provided with a pocket 24 receiving an inner rubber cushioning plate or pad 25, of high capacity rubber, between which and the rear stop plate B' is another rubber plate or pad 26 of the same type. Preferably a metal seat plate 27, of flanged or pan shape, is placed between the two rubber pads or plates, so as to permit the rubber to flow as the load is brought upon its ensuring maximum cushioning effects. The metal plate may serve as part of a means to hold the cushion in a fixed position, and the cushion may be secured in practice to the rear end of the gear housing by any suitable substantial attaching means. The use of this cushion gives an increased velvety action to assist the draft gear in absorbing shocks and jars which otherwise might be transmitted to the car.

Figure 5:
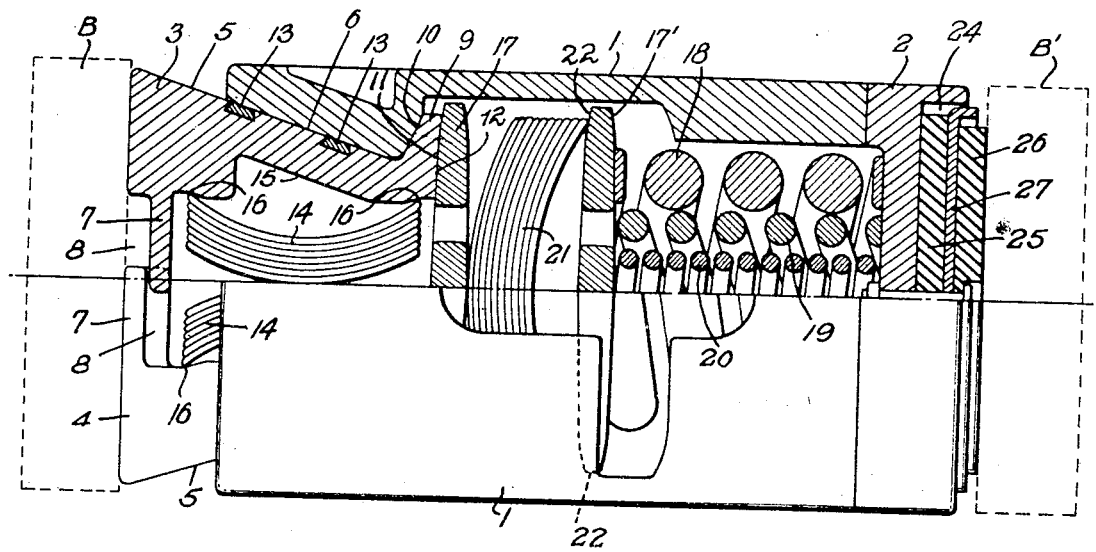
Fig. 5 is a top plan view, partly in section, of the gear housing and parts therein.
Figure 6:
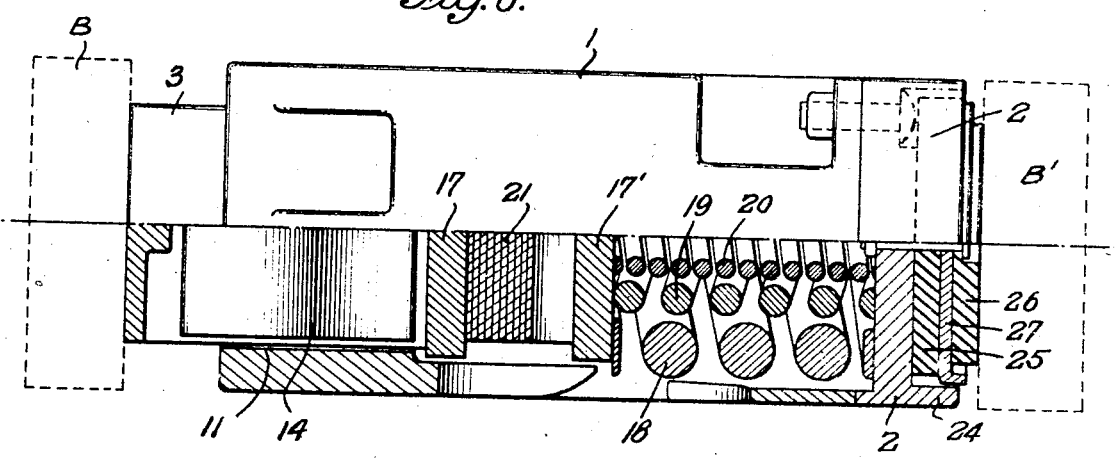
Fig. 6 is a side elevation, partly in section, of the same.
Figure 7:
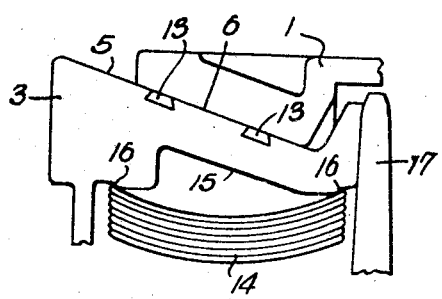
Fig. 7 is a diagrammatic section illustrating the action of one of the longitudinal springs in partly compressed condition.
Figure 11:
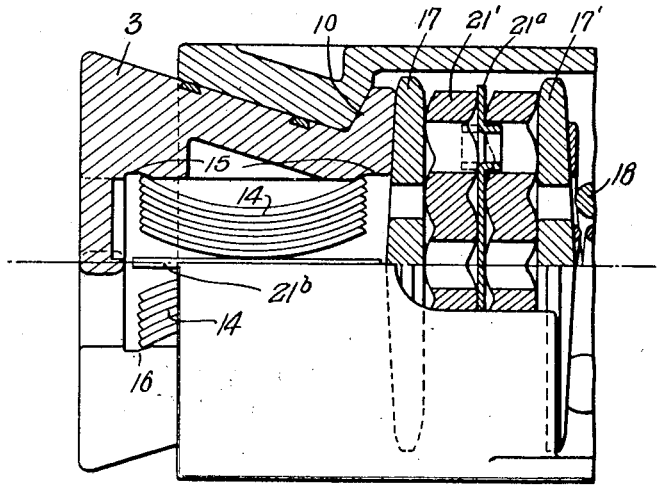
Fig. 11 is a view similar to Fig. 9 showing another modification.
Figure 13:
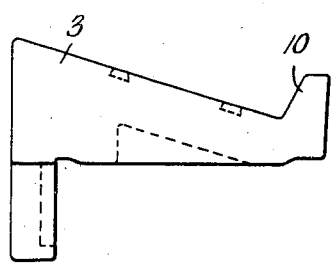
Figs. 12, 13 and 14 are views of one of the friction shoes.
Figure 12:
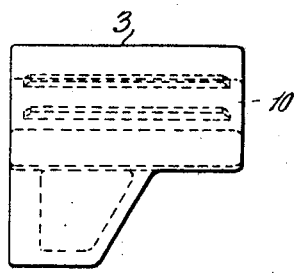
Figure 14:
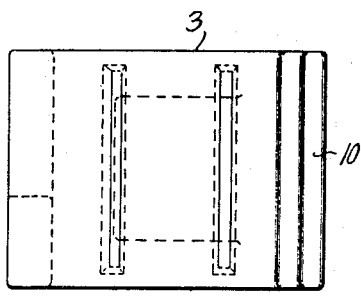

Fig. 11 is a top plan view, partly in section, of the gear housing and parts therein, and similar to Fig. 5, but showing a modification in which the transverse friction spring 21' is composed of a perforated corrugated rubber cushion means with a metal positioning disk 21a between the corrugated layers of rubber, for the purpose of providing maximum compression of the rubber cushion, and a flat division plate 21b placed between the bundles of vertical springs 14, which thickness is controlled to the extent needed to allow the gear to become fully closed without compressing the vertical springs 14 to a solid position. The friction shoes 3 and 4 are modified so that tongue and groove 7 and 8 will both be parallel with the top of shoes 3 and 4, joining each other at diagonal edges in the center of the width of the wedge, as they come together to a full closed position.

From the foregoing description, taken in connection with the drawings, the construction, mode of operation and advantages of our improved draft gear will be readily understood and the advantages thereof appreciated by those versed in the art without a further and extended description. It will be understood, of course, that changes in the form, proportions, and details of construction of the parts, additional to those disclosed, may be made within the scope of the appended claims without departing from the spirit or sacrificing any of the advantages of the invention.

What we claim is:—

1. In a spring cushioned friction draft gear, a housing having a friction surface at one end thereof, sliding friction shoes to engage said surface, springs backing said shoes, a pair of followers in the housing, one of said followers engaging said shoes, buffer springs between the other follower and opposite end of the casing, and an elliptical cushioning spring between the followers having its ends in slidable and varying bearing engagement with one of said followers at opposite ends, said bearing surfaces of said followers being so constructed, related, and arranged that the effective length of the springs is decreased under compression.

2. In a spring cushioned friction draft gear, and in combination with longitudinally slidable and laterally expansible and contractible friction generating members, and longitudinally movable abutment and cushioning members, semi-elliptical springs disposed between and acting to laterally expand the friction generating members, and a semi-elliptical spring between the abutment and cushioning members for cushioning actions therewith, each spring and the member against which it bears having relatively slidable friction generating surfaces cooperatively constructed for shifting engagement to decrease the effective length and increasing the resisting capacity of the spring as the effective length decreases.

3. In cushioning means for a draw bar with the housing for the cushioning means operatively secured to the car sills, cushioning means contained in the housing comprising a plurality of nested semi-elliptic spring plates and a bearing shoe, the ends of the outer plate slidingly engaging friction bearing surfaces on the bearing shoe, said friction bearing surfaces being radially formed to conform to the shape of the semi-elliptic spring plate, and arranged to change underload the span of the bearings of said shoes to provide for the shortening of the span between the bearing contact of the semi-elliptic plates on said bearing shoe, insuring increased capacity of the springs to resist with increased force the forces brought against it by the draw bar when the draw bar is moved rearwardly and forwardly under impact and draft, as vehicles to which it is attached are being moved in trains.

GEORGE H. EMERSON.
JOHN J. TATUM.